Dec. 17, 1940.     E. A. CORBIN, JR     2,225,036
AUTOMATIC ATTACHMENT FOR PIPE MOLDING MACHINES
Filed Aug. 4, 1939     6 Sheets-Sheet 1
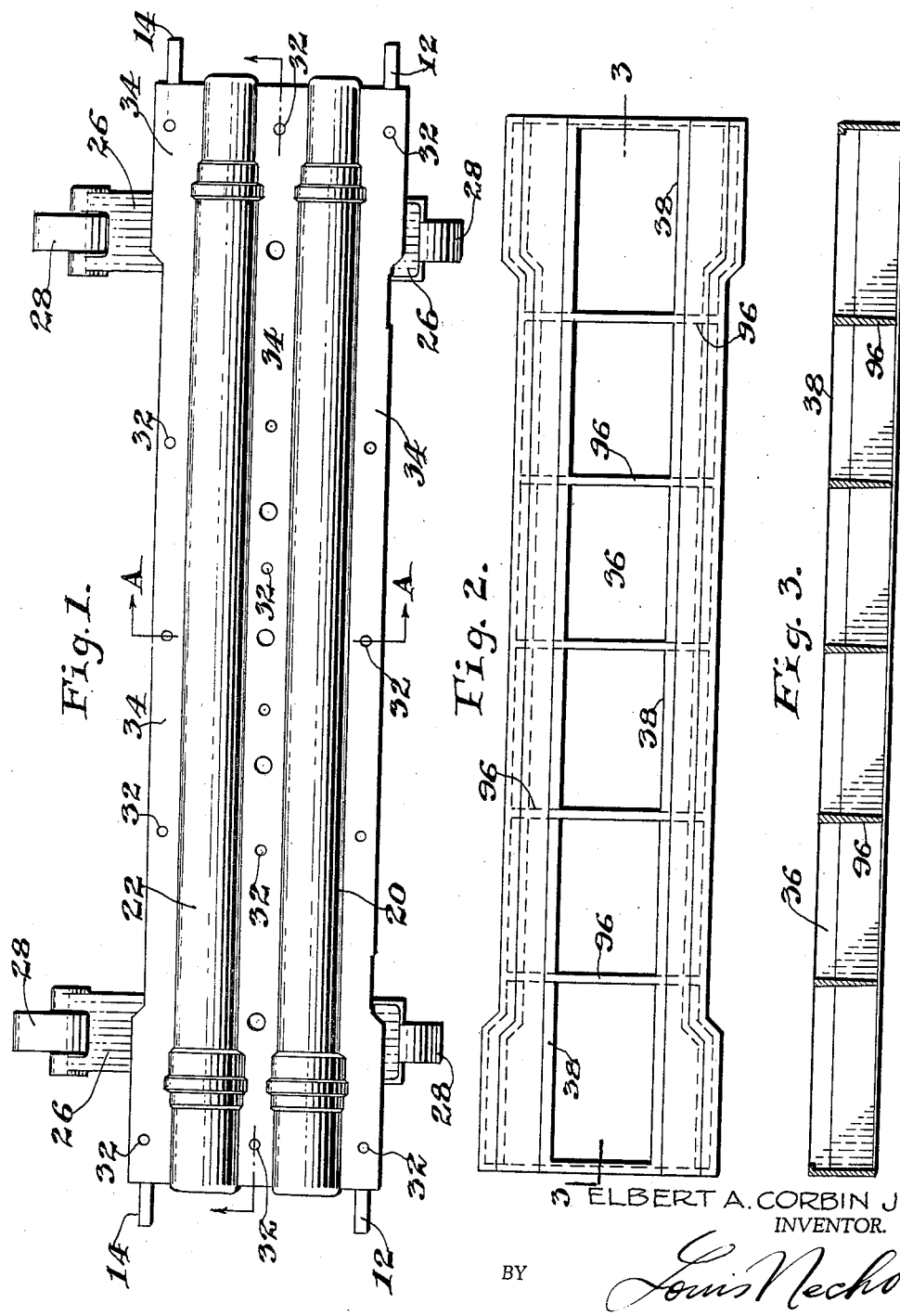
ELBERT A. CORBIN JR.
INVENTOR.
BY Louis Necho
ATTORNEY.

Dec. 17, 1940.  E. A. CORBIN, JR  2,225,036
AUTOMATIC ATTACHMENT FOR PIPE MOLDING MACHINES
Filed Aug. 4, 1939  6 Sheets-Sheet 2
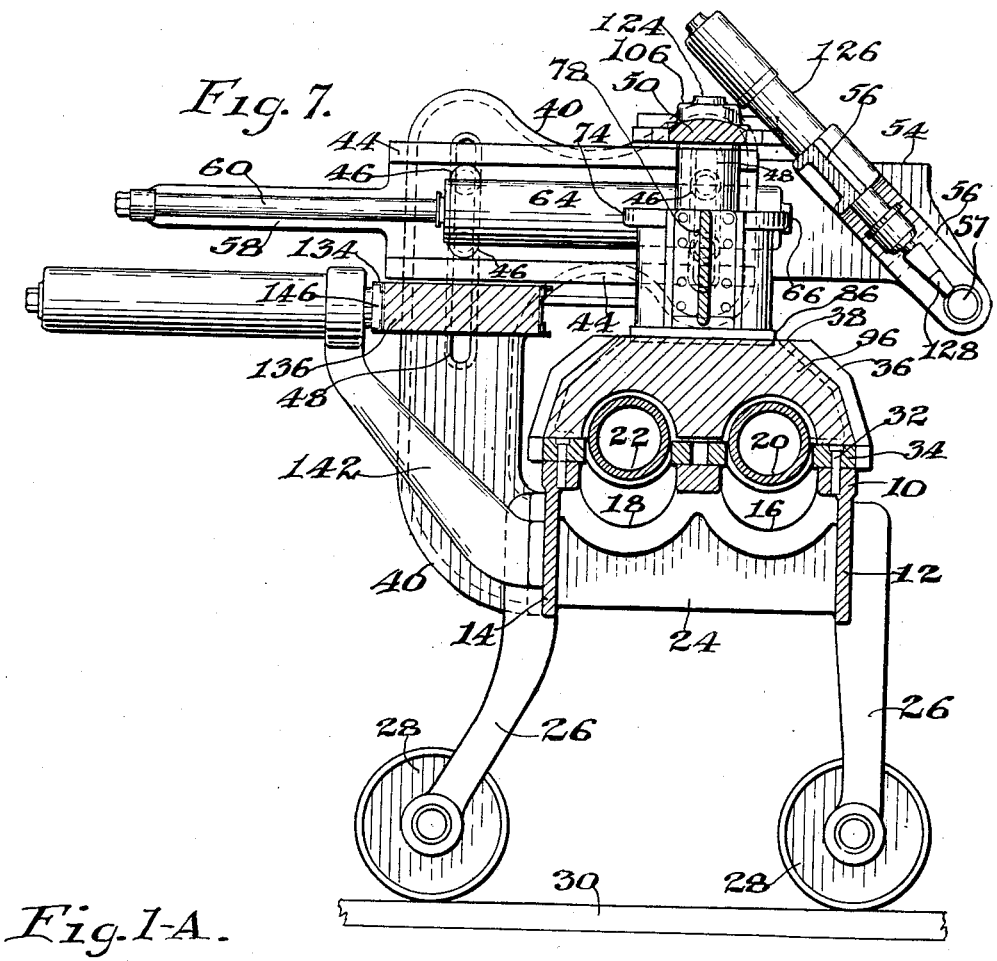
Fig. 7.
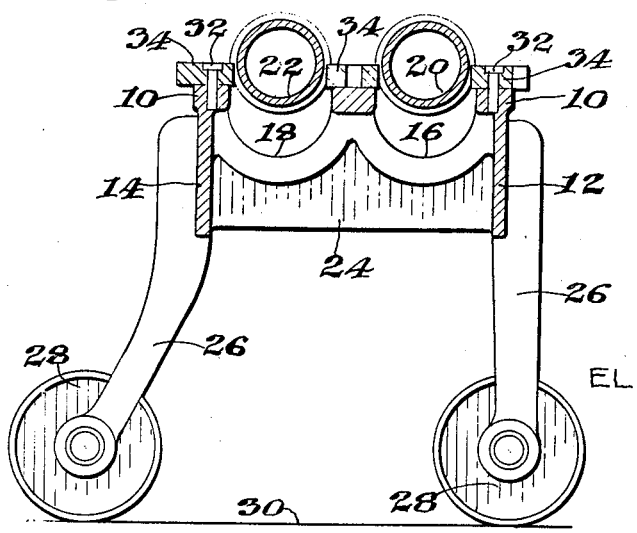
Fig. 1-A.
ELBERT A. CORBIN JR.
INVENTOR.
Louis Necho
ATTORNEY.

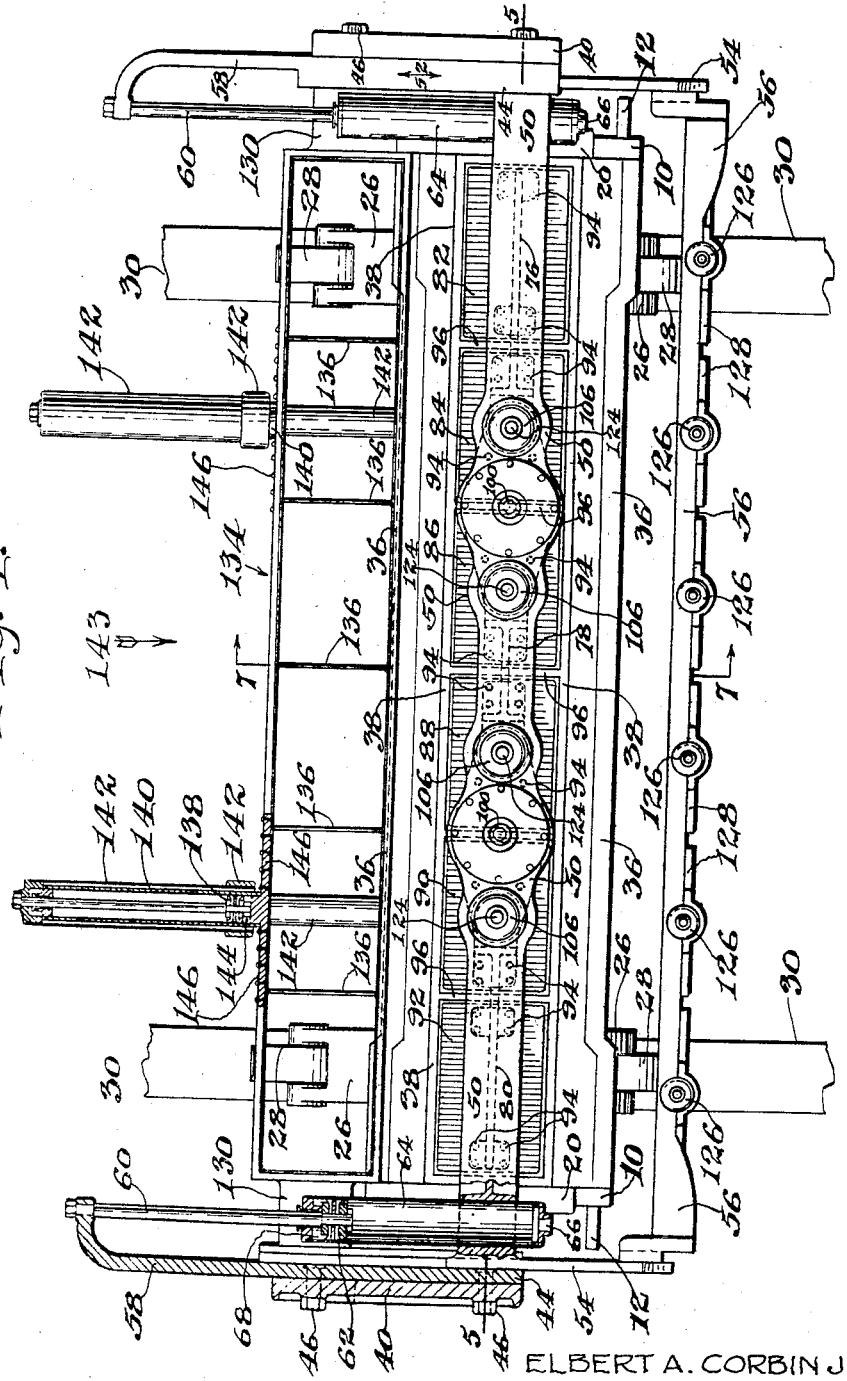

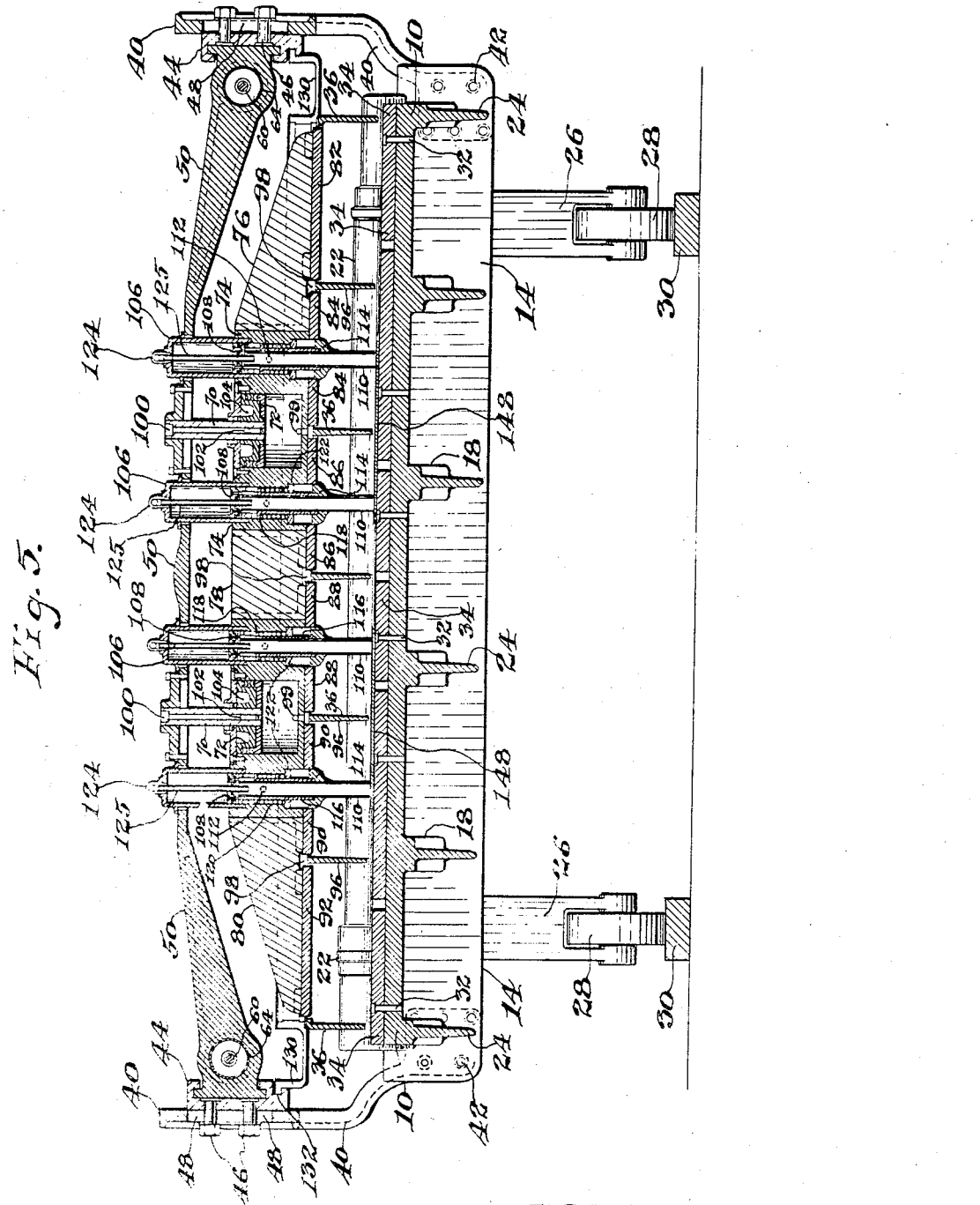

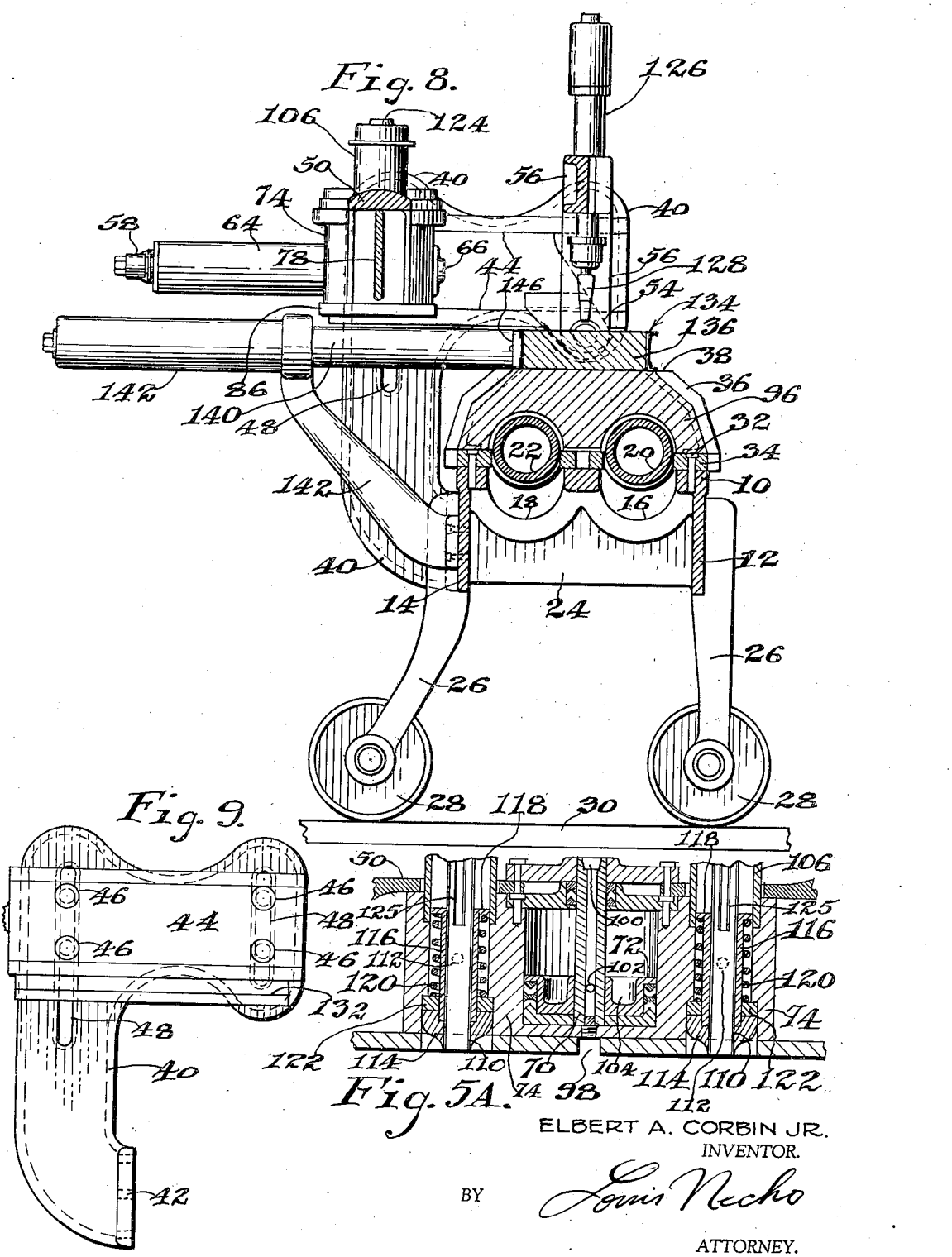

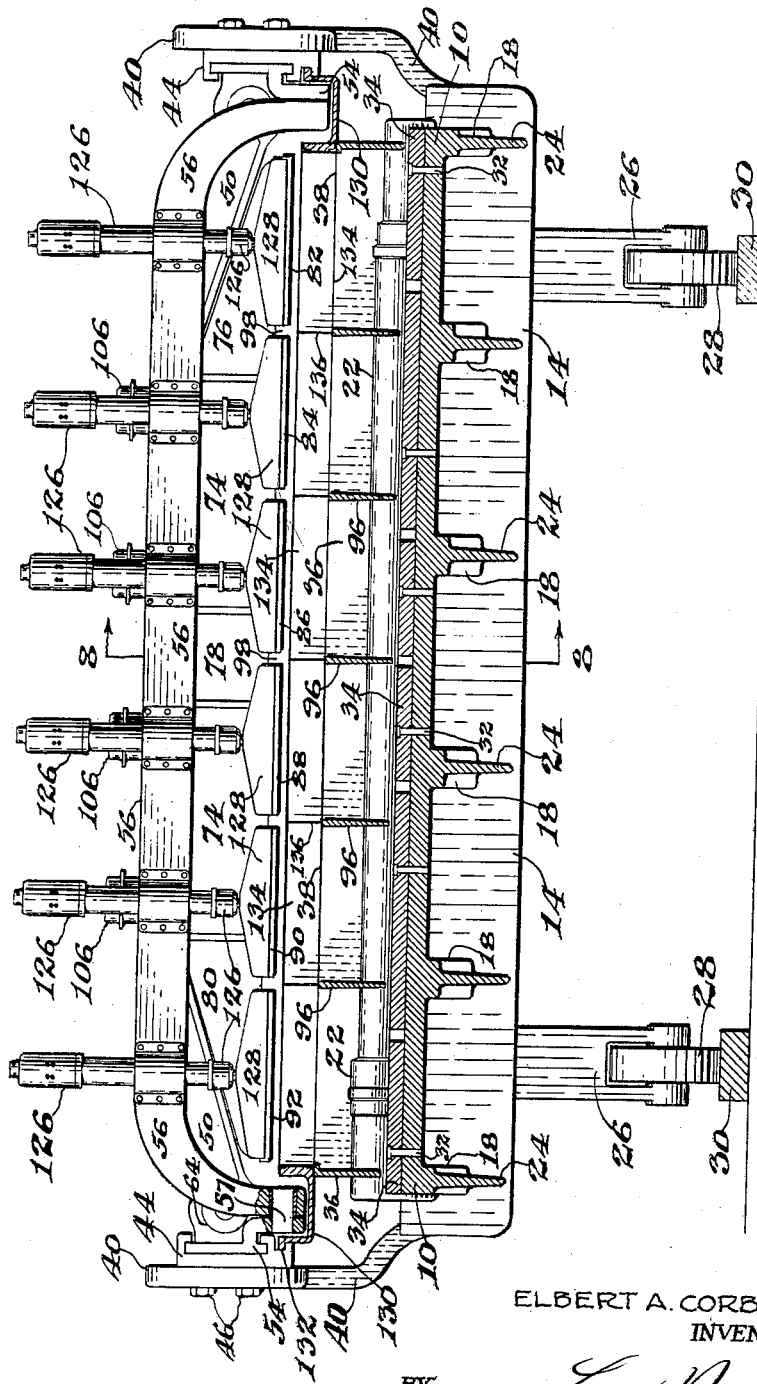

Patented Dec. 17, 1940

2,225,036

UNITED STATES PATENT OFFICE 2,225,036

AUTOMATIC-ATTACHMENT FOR PIPE MOLDING MACHINES

Elbert A. Corbin, Jr., Lansdowne, Pa., assignor of one-half to William C. Biddle, Lansdowne, Pa.

Application August 4, 1939, Serial No. 288,288

2 Claims. (Cl. 22—41)

My invention relates to a new and useful automatic attachment for pipe molding machines whereby the heretofore very arduous and fatiguing labor involved in the operation of the machine is almost entirely eliminated and whereby the operation of the machine is rendered substantially mechanical and automatic in its entirety.

My invention still further relates to an automatic attachment of this character which greatly increases the output of the machine and by means of which the machine is adapted for substantially continuous operation in successive synchronized stages or steps, and whereby the number of stages or steps which would be involved in manual operation is decreased and the time consumed for each step or stage is reduced.

My invention still further relates to an automatic attachment of this kind which can be readily applied to existing, manually operated pipe molding machines without any material alteration of the conventional machine, and which can be actuated from any convenient source of fluid pressure.

My invention still further relates to an automatic attachment of this character which is adapted for adjustable mounting with respect to a conventional pipe molding machine whereby a wide range of molds for pipes of different diameters can be conveniently made.

Other novel features of advantage and construction will be more clearly understood from the following specification and the accompanying drawings in which:

Fig. 1 represents a top plan view of a movable pipe molding machine showing the stripping plates and patterns and with the flask removed.

Fig. 1A represents a section on line A—A of Fig. 1.

Fig. 2 represents a top plan view of the flask adapted to be positioned on the molding machine shown in Fig. 1.

Fig. 3 represents a section on line 3—3 of Fig. 2.

Fig. 4 represents a top plan view of the machine shown in Fig. 1 with my automatic attachment applied thereto, certain parts being shown in section better to illustrate details of construction, and the machine shown in the squeezing position.

Fig. 5 represents a vertical sectional view on line 5—5 of Fig. 4 showing the machine in the squeezing position.

Fig. 5A represents, on an enlarged scale, a fragmentary view in vertical section of one of the squeeze butt-off units and adjacent sprue-hole cutters and font-forming devices showing details of construction the same shown in the inoperative position.

Fig. 6 represents, partly in section and partly in elevation, a view similar to Fig. 5 showing the machine in the peening position.

Fig. 7 represents a vertical section on line 7—7 of Fig. 4.

Fig. 8 represents a view similar to Fig. 7 taken on line 8—8 of Fig. 6.

Fig. 9 represents a view in side elevation of one of the main supporting brackets.

Referring to the drawings in which like reference characters indicate like parts and more particularly to Figs. 1, 1A, 2 and 3 which illustrate the general construction of a conventional, hand-operated, pipe molding machine, 10 designates the table top which is conventionally cast integrally with the front and rear skirts 12 and 14, and which is provided with the longitudinal recesses 16 and 18 for accommodating the patterns 20 and 22 and which will hereinafter be further referred to. 24 designates the reinforcing webs disposed at suitable intervals as best seen in Fig. 6. The table top 10 and all of the conventional adjuncts thereof heretofore described are supported by the legs 26 which are provided with the wheels 28 and the entire pipe molding machine is adapted to be moved back and forth on the tracks 30. Secured to the table top 10 as at 32 are a plurality of stripper plates 34 which are also conventional. The patterns 20 are held in position by trunnions at either end of the machine and they are actuated into or out of position, as hereinafter described by a cam-crank mechanism which, being also conventional, is not shown. 36 designates the conventional, sectional flask which in the case of pipe molding, is identical for the cope and drag sections of the mold, and which is positioned on the stripper plates 34 as best seen in Figs. 5, 6, 7 and 8.

According to conventional practice the patterns 20 and 22 are brought into the position shown, for instance, in Fig. 7 by the cam-crank mechanism referred to and the flask 36 is manually filled with sand and the operator then manually tamps or peen-rams the sand. As the sand is compressed the flask 36 has to be repeatedly refilled and peen-rammed until the sand is packed tight up to the upper edge 38 of the flask. The operator then manually strikes off excess sand before the flask is subjected to the squeeze, butt-off operation. This completes the conventional operation for a drag. If the flask be intended for a cope the operator has to mount spaced sprue pins on the stripper plates and must peen-ram the sand around the pins and, after the mold is formed, the pins are removed to form sprue holes and then the operator must manually prepare the pouring fonts at the top of the sprue holes.

According to my invention I provide the two main supporting brackets 40, one at each end of the machine, the shape of which is best seen in Fig. 9 and which are suitably bolted to the rear skirt 14 as at 42. Fastened to the brackets 40 are the reciprocating tracks 44 which are ad-adjustable vertically with respect to the brackets 40 by means of the bolts 46 engaging the slots 48. 50 designates a yoke extending the entire length of the machine (see Figs. 4 and 5), this yoke being slidable in the direction of the arrow 52 in the brackets 44. The yoke 50 is provided with the extensions 54 which support at their outer ends the secondary yoke 56 which is movable in the direction of the arrow 52 with the movement of the yoke 50. The tracks 44 are provided with the extension brackets 58 which support the fixed piston rods 60 which carry the pistons 62 over which are slidable the cylinders 64 in a manner hereinafter described, the cylinders 64 being secured at their front ends to the juxtaposed ends of the yoke 56. In order to reciprocate the yokes 50 and 56 air is introduced into the cylinders 64 at their front ends 66 which brings the parts into the position shown in Fig. 4 and in which the machine is in a position to squeeze or butt-off. In order to retract the yokes 50 and 56 in the opposite direction in order to bring the machine in the position shown in Fig. 6, in which the machine is ready for the operation of peen-ramming, air is introduced into the chambers 68 of the cylinders 64, that is, on the other side of the pistons 62.

The yoke 50 is rigidly mounted as far as vertical movement is concerned, as viewed in Fig. 5, and it carries a plurality of fixed piston rods 70 on which are fixedly mounted the pistons 72. Having sliding relation with respect to the pistons 72 are the cylinder housings 74. The cylinder housings 74 are interspaced with and secured to the castings 76, 78 and 80, so that, to all intents and purposes, the sections 76, 78 and 80 are integrated with each other and with the casings of the cylinders 74 to form a unitary, multiple, squeeze, butt-off construction. The castings 76, 78 and 80 and the intermediate cylinder casings 74 are provided, on their underside with the platens 82, 84, 86, 88, 90 and 92, which are bolted as at 94 (see Fig. 4). 96 designates the flask bars (Figs. 2 and 6) and in order to allow for downward movement of the platens and also to limit downward movement, I provide the recesses 98 in the castings 76, 78 and 80 and into which the top edges of the bars 96 enter when the platens are depressed into the squeezing, butt-off position. The depth of the recesses 98 limits the downward movement of the platens. In order to depress the platens 82 to 92 onto the flask 36 I introduce compressed air into the cylinders 74 through the holes 99 in the walls of the cylinders below the piston 72, and, in order to elevate the platens from the flask, compressed air is introduced through the passage 100 which communicates through the opening 102 with the chamber 104 on the upper side of the double-acting piston 72. In the interests of clarity, and inasmuch as this will be known to those skilled in the art, I deem it unnecessary to show the air conduits or the source of compressed air, etc.

Also carried by the yoke 50 are the fixed cylinders 106 in which are disposed the sliding pistons 108 which carry the pipes 110 for the purpose of cutting sprue holes in the mold after the squeeze, butt-off operation is completed, and, in order to depress the sprue cutters 110 into the mold, air is introduced in any suitable manner to the cylinders 106 above the pistons 108. In order to return the pistons 108 into their original position and thus to retract the sprue cutters from the flask, air is introduced through the openings 112 or below the pistons 108. Sliding on the sprue cutters 110 are the font-forming devices 114 which are of the general shape illustrated in Figs. 5 and 5A. The font formers 114 are engaged by the sliding sleeve 116 the upper end of which is deflected as at 118, and there is a spring 120 confined between the upper flange 118 and the stop 122. Thus, when air is introduced into the cylinders 106, the font-forming devices 114 are depressed into the position shown in Fig. 5 and, when the air is released from the cylinders 106 in any suitable manner, the springs 120 retract the font formers into their inoperative position above the flask as best seen in Fig. 5A. After the squeeze, butt-off operation is completed and the yoke 50 is retired from registration with the flask 36, air is introduced through the openings 124 into the pipes 125 which lead into the hollow sprue cutters 110 to eject therefrom the sand that enters the pipes 110 while the sprue holes are being cut.

As will best be seen from Figs. 4 and 6 the yoke 56 carries the pneumatic peen rammers 126 which are conventional in their structure and operation and therefore need not be described in detail except to say that in lieu of conventionally tapered heads I have provided the peen rammers 126 with the elongated heads 128 to cover the entire length of the corresponding flask section.

Referring to Fig. 4 it will be seen that I provide the brackets 130 which slide in the groove 132 formed in the bracket 40 (see Figs. 5 and 6). The brackets 130 support the elongated hopper 134 which is divided into a plurality of sections by the vertical partitions 136 so as to form a plurality of hoppers corresponding to the number of flask sections formed between the flask bars 96. The hoppers are adapted to be moved into registration with the flask 36 by means of the pistons 138 (Fig. 4) reciprocating within the cylinders 140 which are carried in fixed position by the brackets 142 which in turn are suitably attached to the skirt or other part of the frame or machine. In Fig. 4 the hopper 134 is shown retracted into the inoperative position or out of registration with the flask 36. If it is desired to move the hopper in the direction of the arrow 143 in Fig. 4, air is introduced to the cylinder 140 at the point 144 which causes the cylinder 140, which is connected to the hopper 134 at 146, to move in the direction of the arrow thus bringing the hopper 134 into alignment with the flask 36. In order to retract the hopper into the position shown in Fig. 4 air is introduced to the cylinder 140 on the other side of the piston 138.

The operation is as follows:

With the molding machine as shown in Fig. 1, that is, with the patterns 20 and 22 in proper position, the flask 36 is positioned over the patterns as shown in Fig. 8. The hopper 134 is then advanced in the direction of the arrow 143 under the squeeze butt-off mechanism until it is in registration with the flask 36. The hopper 134, which is open at the top and bottom, in reality forms an extension for the flask 36 so that the amount of sand initially introduced into the combined flask and hopper will suffice for the making of the mold without the necessity for replenishment. Thus, without the hopper 134, when the flask 36 is filled and the sand is packed, it is necessary to stop and replenish the sand more than once. The hopper 134, holding more sand than is necessary to form the mold, provides the additional sand needed due to shrinkage in volume as a result of the peen-ramming. After the hopper has been placed in position, air is introduced into the cylinders 64 to move the yokes 50 and 56 in a direction opposite to that of the arrow 143 in Fig. 4 so as to bring the peen-rammers 126 in registration with the top of the hopper. The parts now appear as shown in Fig. 8. By reference to Fig. 7 it will be seen that the peen-rammers 126 are mounted in any suitable pivotal manner so as to be swingable about an arc and the operator then guides the peen-rammers 126 over the width of the hopper as shown in Fig. 8 so that the hammers 128 of the peen-rammers 126 will be brought to play on the entire surface of the sand in the hopper. When the peen-ramming operation is completed the hopper 134 is retracted into the position shown in Fig. 7 and in so doing the hopper "strikes off" any excess sand from the upper surface of the flask 36 thus eliminating the necessity of a manual strike-off operation which is a part of the conventional procedure. Air is now introduced into the cylinders 64 to move the yokes 50 and 56 in the direction of the arrow 143 in Fig. 4 to bring the squeeze butt-off units into registration with the flask 36 as shown in Fig. 7 and compressed air is used to press the platens, carried by the squeeze butt-off units, on top of the respective sections of the flask 36. Simultaneously with the squeeze butt-off operation air is introduced into the cylinders 106 to force the sprue-hole cutters 110 into the sand until they come in contact with the gates 148. This forms the sprue holes, which, as above stated, would have to be formed conventionally by means of pins mounted on the gates and subsequently removed, etc. At the same time the font-forming devices 114 are depressed to form cup-shaped recesses around the upper edges of the sprue holes so that the mold is ready for casting. When all these operations have been completed, the patterns 20 and 22, by means of the crank mechanisms at either end (not shown), are lowered into the recesses 16 and 18 and in this way the mold itself is not in any way disturbed by the stripping operation. The flask 36 is now ready to be removed from the table top 34 and the machine is ready for the beginning of a new cycle. While the sprue cutters 110 are in their inoperative position air is blown therethrough to remove the packed sand therein.

It will thus be seen that by means of the automatic attachment embodying my invention the necessity of repeated filling of the flask with loose sand to provide enough sand for a finished packed mold is eliminated; that the manual peen-ramming is done automatically and by power; that the squeeze butt-off is also done automatically and with power; and that the sprue holes and fonts are also formed automatically and with power and with the desired exactness.

With reference to the sprue-cutting and font-forming in molds generally, it is pointed out that the manual cutting of the sprues and the manual forming of the fonts also results in breakage or damage of the mold itself and this is entirely eliminated by the use of my device. Also, the peen-ramming operation, when manually performed, is one of the most exhaustive types of labor and, when manually performed, is not as well performed as with the automatic peens. I am aware that pneumatically operated automatic peens are not new but so far they have been available only on newly manufactured and very expensive machines, whereas by my invention they are embodied in an attachment which renders them applicable to a smaller, less expensive and older machine now extensively in use and which would otherwise have to be operated manually. It is pointed out, however, that conventional pneumatic peen-rammers now available are provided with small round heads very much on the order of a pneumatic drill and that by providing the pneumatic rammers with the elongated heads 128 (see Fig. 6) their efficiency is greatly increased. Since the peen-rammers 126 must be capable of swinging (transversely of Fig. 8) from the right hand to the left hand edge of the hopper 136, I have pivoted the yoke 56, which supports the peen-rammers 126 on the pin 57 so that in actual operation the worker holding the yoke 56 or one of the peen-rammers 126 can swing the peen-rammers all over the surface of the sand to be packed.

Having thus described my invention what I claim as new and desire to secure by Letters Patent is:

1. An automatic attachment for molding machines comprising brackets adapted to be attached to said molding machine, a track carried by each of said brackets, a pair of horizontally spaced and rigidly interconnected yokes mounted above said molding machine and reciprocable on said tracks, peen rammers carried by one of said yokes, squeeze butt-offs carried by the other of said yokes, means for reciprocating said yokes on said tracks successively to bring said peen rammers and said squeeze butt-offs into and out of registration with a flask mounted on said molding machine and means for actuating said peen rammers and said squeeze butt-offs.

2. An automatic attachment for molding machines comprising brackets adapted to be attached to said molding machine, a track carried by each of said brackets, a pair of horizontally spaced and rigidly interconnected yokes mounted above said molding machine and reciprocable on said tracks, peen rammers carried by one of said yokes, squeeze butt-offs carried by the other of said yokes, means for reciprocating said yokes on said tracks successively to bring said peen rammers and said squeeze butt-offs into and out of registration with a flask mounted on said molding machine, means for actuating said peen rammers and said squeeze butt-offs, auxiliary tracks carried by said brackets, a hopper horizontally reciprocable on said auxiliary tracks, and means for reciprocating said hopper into and out of registration with said flask.

ELBERT A. CORBIN, Jr.